(12) United States Patent
Banhagel

(10) Patent No.: US 6,481,593 B2
(45) Date of Patent: Nov. 19, 2002

(54) REMOVABLE PLANT CONTAINER AND METHOD OF USE

(76) Inventor: Michael Banhagel, 129 Loma La., Apt. B, San Clemente, CA (US) 92672

( * ) Notice: Subject to any disclaimer, the term of this patent is extended or adjusted under 35 U.S.C. 154(b) by 0 days.

(21) Appl. No.: 09/992,833

(22) Filed: Nov. 14, 2001

(65) Prior Publication Data

US 2002/0056716 A1 May 16, 2002

Related U.S. Application Data

(60) Provisional application No. 60/248,870, filed on Nov. 14, 2000.

(51) Int. Cl.[7] ............................................... A01G 9/00
(52) U.S. Cl. ...................... 220/676; 220/677; 47/65.5
(58) Field of Search ................................ 220/676, 677, 220/693, 601; 229/101, 201, 240, 243, 244; 47/65.5

(56) References Cited

U.S. PATENT DOCUMENTS

| | | | |
|---|---|---|---|
| 938,497 A | * 11/1909 | Mooney | ..................... 220/677 |
| 1,234,730 A | * 7/1917 | Chapman | ..................... 220/676 |
| 2,023,030 A | * 12/1935 | Plunkett | ..................... 229/201 |
| 3,162,981 A | 12/1964 | Miller | |
| 3,195,272 A | 7/1965 | Mosher et al. | |
| 3,313,333 A | 4/1967 | Lordi | |
| 3,552,082 A | * 1/1971 | Howard | ................... 229/101 X |
| 3,580,484 A | * 5/1971 | Schneider | ............... 229/243 X |
| 4,223,480 A | 9/1980 | Welty | |
| 4,939,865 A | * 7/1990 | Whitcomb et al. | ............ 47/66 |
| 5,099,607 A | * 3/1992 | Lawton | ................... 220/693 X |
| 5,157,869 A | 10/1992 | Minton | |
| 5,865,367 A | * 2/1999 | Benham | ..................... 229/240 |

* cited by examiner

Primary Examiner—Steven Pollard
(74) Attorney, Agent, or Firm—Oppenheimer Wolff & Donnelly, LLP

(57) ABSTRACT

A removable plant container for growing and transporting plants having a base member in communication with a lateral support wall. The base member and lateral support wall define a receiving aperture, having a volume V, for receiving the plant and growing media therein. At least one removal device is in communication with the lateral support wall, the base member, or both. Actuation of the at least one removal device results in an increase in the volume of the receiving aperture from volume V to volume V', thereby permitting the removal of the plant and growing media without damage to the plant root system of root ball.

22 Claims, 11 Drawing Sheets

Prior Art

REMOVABLE PLANT CONTAINER AND METHOD OF USE

CROSS REFERENCE TO RELATED APPLICATIONS

The entire contents of U.S. Provisional Patent Application No. 60/248,870, entitled "Removable Plant Container", filed on Nov. 14, 2000, naming Michael Banhagel as inventor, is hereby incorporated by this reference in its entirety.

BACKGROUND OF THE INVENTION

Agricultural pots, containers, and cans are traditionally used for the containment of soil or other growing media useful in growing plants or shrubs. Typically, these devices, herein referred to as "plant pots", form a containment vessel capable of protecting the plant root structure located within the growing medium from damage during shipping. In addition, these plant pots enable the continued development of a plant prior to permanent implantation.

Currently, a wide variety of plant pots are available in a plurality of forms and configurations for general or specialized use. As shown in FIG. 1, these plant pots 1 include a pot base member 3 in communication with a lateral support wall 5. A soil receiving aperture 7 is formed by the lateral support member 5 and the pot base member 3. Additionally, these plant pots 1 may include a watering plate 9, which is capable of detachably engaging the pot base member 3 of the plant pot 1. The pot base member 3 or the lateral support wall 5 may have at least one drainage hole 11 formed therein to permit the drainage of excess water from the growing media.

Commonly, plant pots are manufactured from a variety of materials including, for example, various clays, cements, metals, ceramics, and plastics. Disposable plastic plant pots are frequently used in the nursery industry due to their relative low cost. These disposable plastic plant pots must be capable of withstanding the rigors of shipping and handling while providing adequate support to the soil or growing media and encourage continued plant development. One shortcoming associated with these disposable plastic plant pots relates to removing the plant from the plant pot for replanting or implantation. Over time, the soil or growing media containing the plant root system may become entrenched within the disposable plant pot, making the removal of the plant root system from the disposable plastic plant pot difficult if not impossible. Typically, the plant removal process results in substantially if not irreversible damage to the plant root system.

Thus, there is a need for a plant pot device capable of providing sufficient support to soil or a growing media while enabling the removal of the plant and growing media therefrom without damaging the plant root system or root ball.

BRIEF SUMMARY OF THE INVENTION

The present invention is directed to a plant container useful in growing and transporting plants. Those skilled in the art will appreciate that the present invention enables a user to easily remove a plant from the container without damaging the plant root system or root ball located within a plant growing media.

In one aspect, the present invention comprises a base member, a lateral support wall defining a receiving aperture in communication with the base member, and at least one removal device located on the container. Prior to the actuation of the at least one removal device, the receiving aperture defines a volume V. The at least one removal device is separable from the container, wherein the separation of the at least one removal device results in the volume of the receiving aperture increasing from volume V to volume V'. The increase in the volume of the at least one receiving aperture permits the easy removal of a plant from the container. Those skilled in the art will appreciate that the present invention may be manufactured from a plurality of materials, including, for example, various plastics, acrylics, metals, ceramics, clays, and wood-pulp based materials such as paper.

In another embodiment of the present invention, the removable plant container comprises a base member, a lateral support wall in communication with the base member, a receiving aperture formed by the base member and the lateral support wall, and at least one tear member in communication with and separable from the base member and lateral support wall. Prior to the actuation of the at least one tear member, the receiving aperture defines a volume V. The at least one tear member is positioned on and defines a first portion and a second portion on the lateral support wall, wherein the separation of the at least one tear member from the lateral support wall results in the volume of the receiving aperture increasing from volume V to volume V'. At least one finger hole may be in communication with the at least one tear member.

The present invention also provides a method of removing a plant from a plant container which includes providing a plant container comprising a receiving aperture having a volume V, the receiving aperture formed by a base member in communication with a lateral support wall, providing at least one tear member in communication with the container, actuating said at least one tear member in communication with said container, increasing the diameter of the receiving aperture from volume V to volume V', and removing said plant from said receiving aperture.

Other objects, features, and advantages of the present invention will become apparent from a consideration of the following detailed description.

BRIEF DESCRIPTION OF THE DRAWINGS

The apparatus of the present invention will be explained in more detail by way of the accompanying drawings, wherein.

DETAILED DESCRIPTION OF THE INVENTION

Disclosed herein is a detailed description of various illustrated embodiments of the present invention. This description is not to be taken in a limiting sense, but is made merely for the purpose of illustrating the general principles of the invention. The section titles and overall organization of the present detailed description are for the purpose of convenience only and are not intended to limit the present invention.

The removable plant container of the present invention is capable of receiving and containing plant soil or other plant growing media therein while permitting the user to easily remove the plant root system therefrom without damage. As those skilled in the art will appreciate, the present invention is simple and inexpensive to manufacture and may be constructed in a plurality of shapes and sizes.

Figure 1:
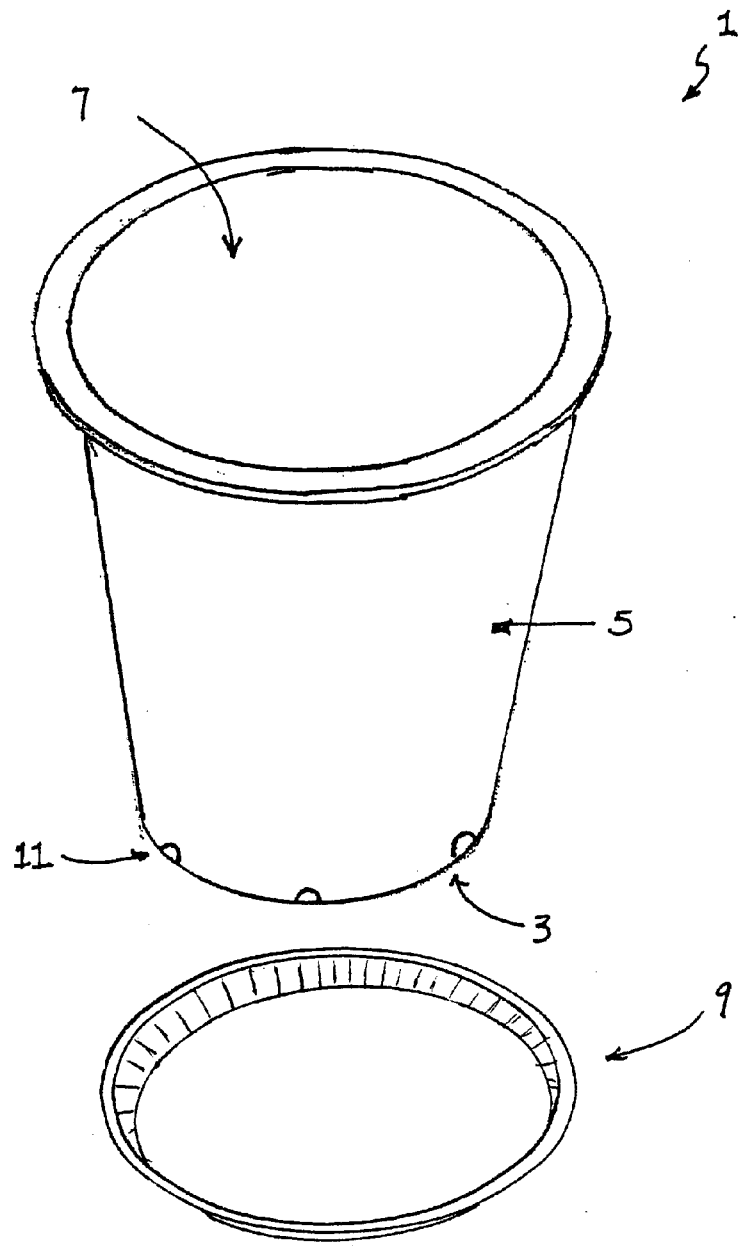
FIG. 1 shows a perspective view of a prior art plant container.

A conventional plant pot is shown in FIG. 1. As shown, the conventional plant pot 1 comprises a pot base member 3 in communication with a lateral support wall 5 which defines a soil receiving aperture 7. The base member 3 of the plant pot 1 may be capable of engaging and retaining a watering plate 9 thereon. At least one drainage hole 11 may be formed on the lateral support wall 5, on the base member 3, or the lateral support wall 5 and the base member 3 to permit the flow of material therethrough. During use, plant soil or other growing media is contained within the receiving aperture 7. Thereafter, a plant root system or root ball is inserted into the plant soil, wherein the plant soil provides support to the plant root system and plant, if present. As shown in FIG. 1, the lateral support wall 5 of the plant pot 1 forms a generally conical shape. However, commonly plant pots 1 are manufactured in a plurality of shapes and sizes.

Figure 2:
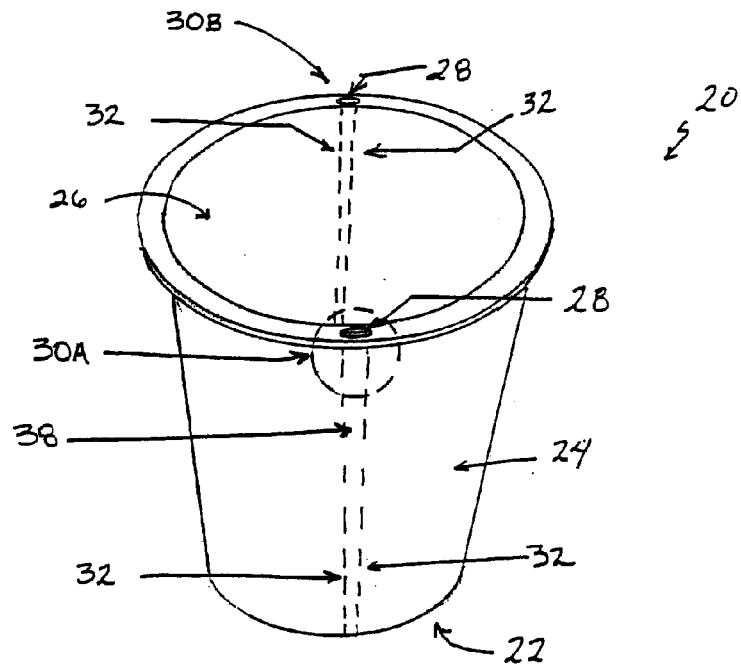
FIG. 2 shows a perspective view of the removable plant container of the present invention.
Figure 3:
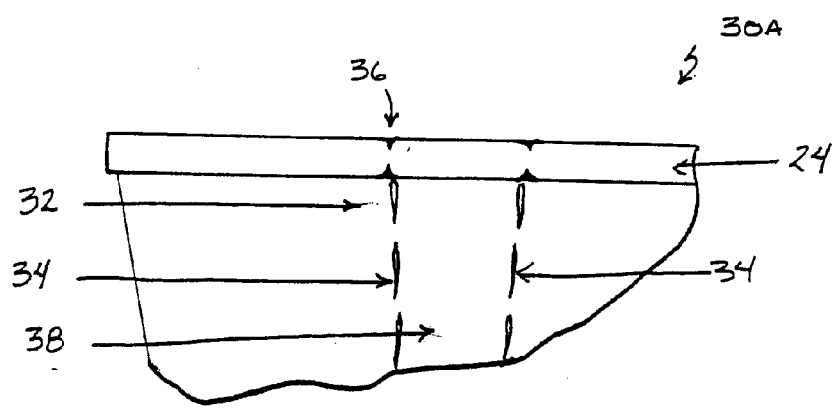
FIG. 3 shows a side view of the at least one removal device of the present invention.

FIGS. 2–3 show the removable plant pot of the present invention. As shown in FIG. 2, the removable plant container 20 comprises a base member 22 in communication with a lateral support wall 24 which defines a receiving aperture 26. At least one finger hole 28 may be formed in the lateral support wall 24. The at least one finger hole 28 is positioned proximate to at least one removal device 30A, 30B, formed in or disposed on the lateral support wall 24. As shown in FIGS. 2 and 3, the at least one removal device 30A, 30B may comprise one or more tear members 38 positioned proximate to or defined by at least one tear strip 32 formed in the lateral support wall 24. Those skilled in the art appreciate that the at least one removal device may comprise perforated slits; slots, retention bridges, hook and loop devices, buttons, straps, zippers or other devices embedded in or otherwise incorporated into the lateral support wall 24, the base member 22, or both. FIG. 3 shows a more detailed side view of the at least one removal device 30A. In one embodiment, the at least one tear strip 32 may comprise a plurality of tear perforations 34 formed in the lateral support wall 24. Those skilled in the art will appreciate that the present invention may be manufactured from a plurality of materials, including, for example, various plastics, acrylics, metals, ceramics, clays, and wood-pulp based materials such as paper. In an alternate embodiment, a plurality of materials or materials having a variety of physical characteristics maybe used to manufacture the present invention. For example, the at least one tear member 38 may be manufactured from a plastic material having a thickness of about 0.0625 inch while the lateral support wall 24 may be manufactured from a plastic material having a thickness of about 0.125 inch.

Figure 4A:
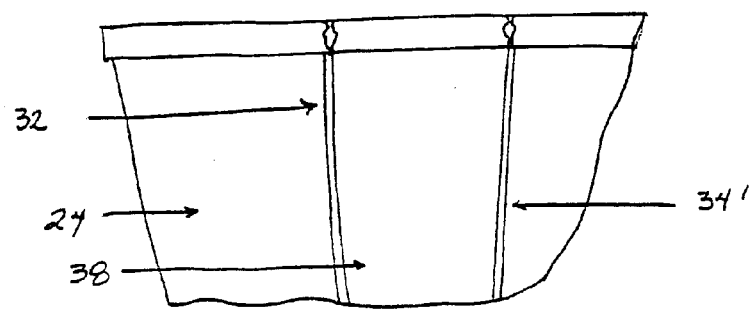
FIG. 4A shows a side view of an alternate embodiment of the at least one removal device of the present invention.
Figure 4B:
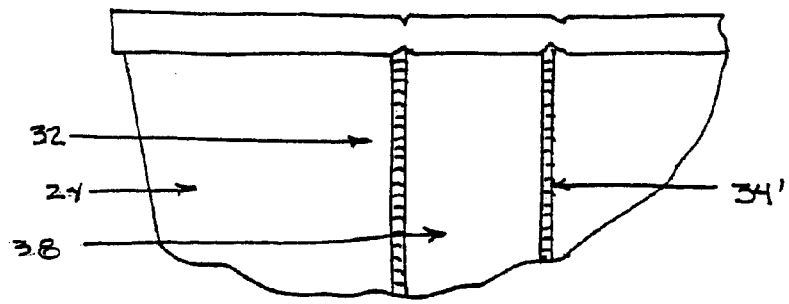
FIG. 4B shows a side view of another embodiment of the at least one removal device of the present invention wherein the at least one removal device comprises at least one v-groove or channel formed in the lateral support wall.

FIGS. 4A and 4B show alternate embodiments of the present invention having one or more tear members 38 located proximate to at least one tear strip 32. As shown in FIG. 4A, the at least one tear strip 32 may comprise at least one tear device 34' positioned on or otherwise incorporated into the lateral support wall 24. Those skilled in the art will appreciate that the exemplary tear devices 34' may include, without limitation, wires, strings, or lines embedded or otherwise incorporated into the lateral support wall 24. FIG. 4B shows another embodiment wherein the at least one tear device 34' comprises at least one groove or channel formed in the lateral support wall 24. Those skilled in the art will appreciate that the at least one groove or channel may be formed by thinning or otherwise providing thinner material within the at least one groove or channel relative to the lateral support wall 24 or the base member 22, or both. The at least one groove or channel may be of continuous width and/or depth. Alternately, the at least one groove or channel may vary in width and/or depth as desired. In addition, the at least one groove or channel may be continuous or may be formed intermittently upon the lateral support wall 24 or the base member 22.

Figure 5:
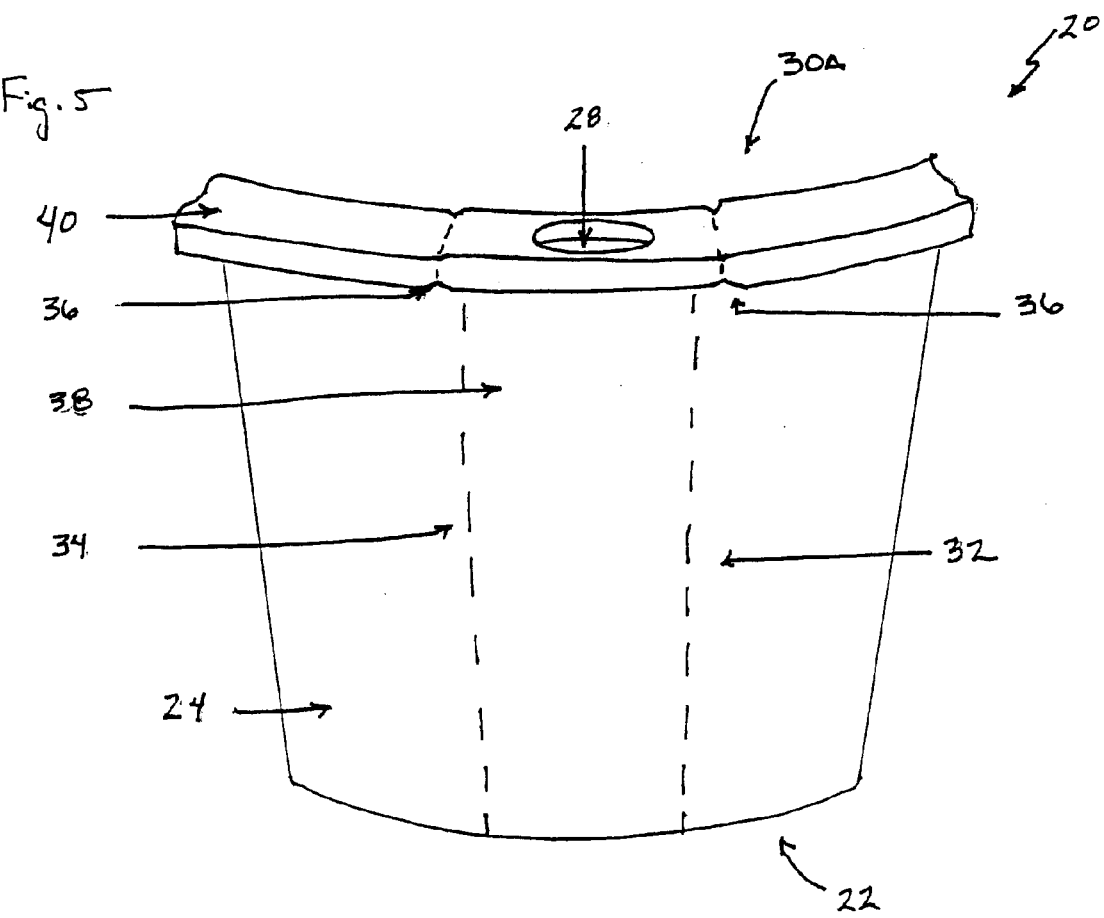
FIG. 5 shows a perspective view of the at least one removal device positioned on the lateral support wall of the present invention.

FIG. 5 shows a perspective view of a removal device 30A of the present invention. As shown, the removable plant container 20 may include a flange 40 in communication with the lateral support wall 24. The flange 40 may provide a gripping surface for the removable plant container 20. In an alternate embodiment, the flange 40 may include a handle (not shown) or other gripping device attached thereto to enhance the handling of the present invention. The at least one finger hole 28 may be positioned on the flange 40 proximate to the at least one tear starter 36, which are in communication with the at least one tear strip 32 defining at least one tear member 38.

Figure 6:
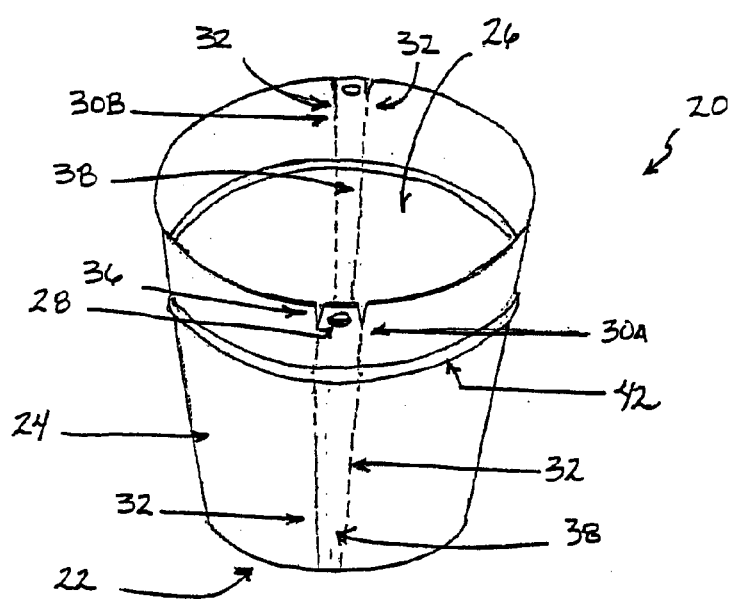
FIG. 6 shows a perspective view of an alternate embodiment of the removable plant container of the present invention.
Figure 7:
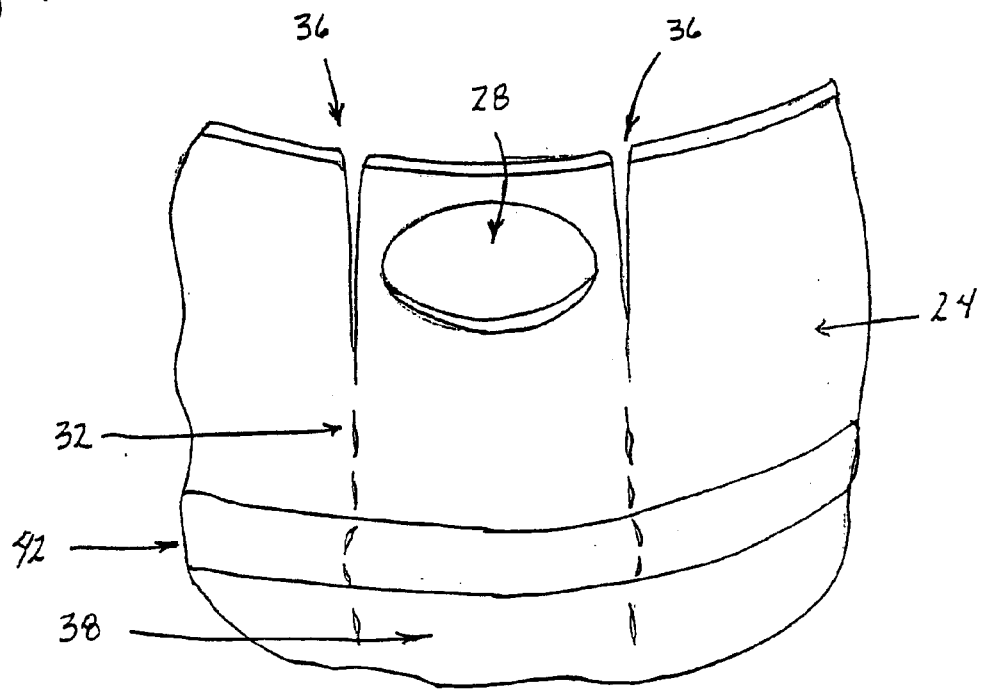
FIG. 7 shows a perspective view of the at least one finger hole located on the lateral support wall of the present invention.

FIGS. 6 and 7 show an alternate embodiment of the removable plant container 20 of the present invention. The reference numerals shown in FIGS. 6 and 7 have analogous meanings to the reference numerals identifying the features of the previous embodiments as shown in FIGS. 1–5. In the present embodiment, the removable plant container 20 may be manufactured without a flange 40. The at least one finger hole 28 may be positioned proximal to at least one tear starter 36 which is in communication with at least one tear strip 32. FIG. 6 shows the at least one finger hole 28 positioned between two tear starters 36. A stiffening ridge 42 may be formed in or otherwise positioned on the lateral support wall 24. The stiffening ridge 42, which intersects the at least one tear strip 32 prevents the accidental release of a plant from the plant container 20.

Figure 8:
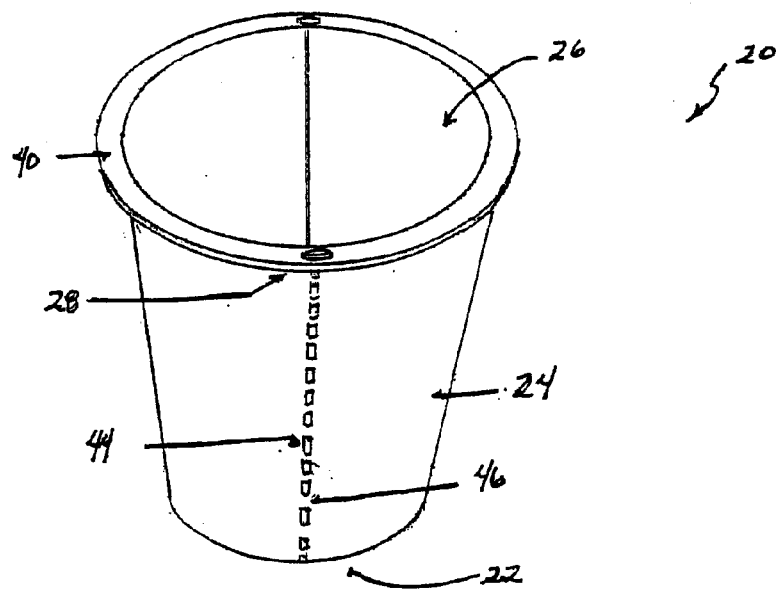
FIG. 8 shows a perspective view of yet another embodiment of the removable plant container of the present invention having at least one removal slot formed on the lateral support wall.
Figure 9:
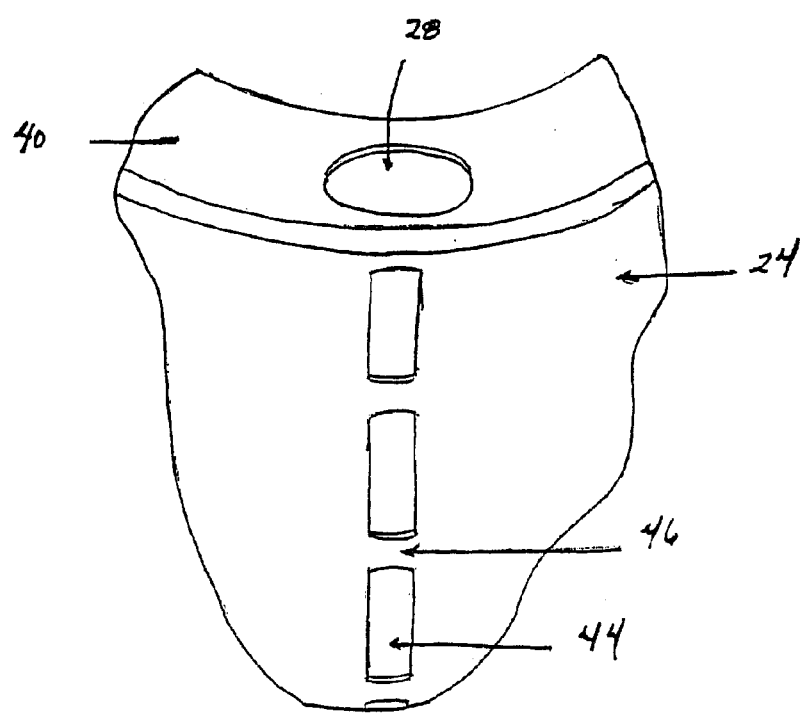
FIG. 9 shows a perspective view of the at least one finger hole located proximate to the at least one removal slot formed on the lateral support wall of the present invention.

FIGS. 8 and 9 show yet another embodiment of the removable plant container 20 of the present invention. The reference numerals shown in FIGS. 8 and 9 have analogous meanings to the reference numerals identifying the features of the previous embodiments as shown in the preceding figures. In the present embodiment, the lateral support wall 24 of the removable plant container 20 may include at least one removal slot 44 formed therein. As shown, the removal slot 44 is positioned on the lateral support wall 24 co-axially aligned with the longitudinal axis of the removable plant container 20, proximate to the at least one finger hole 28. One or more retention members 46 may traverse the at least one removal slot 44. FIG. 9 shows the at least one finger hole 28 positioned proximate to the removal slot 44.

Figure 10:
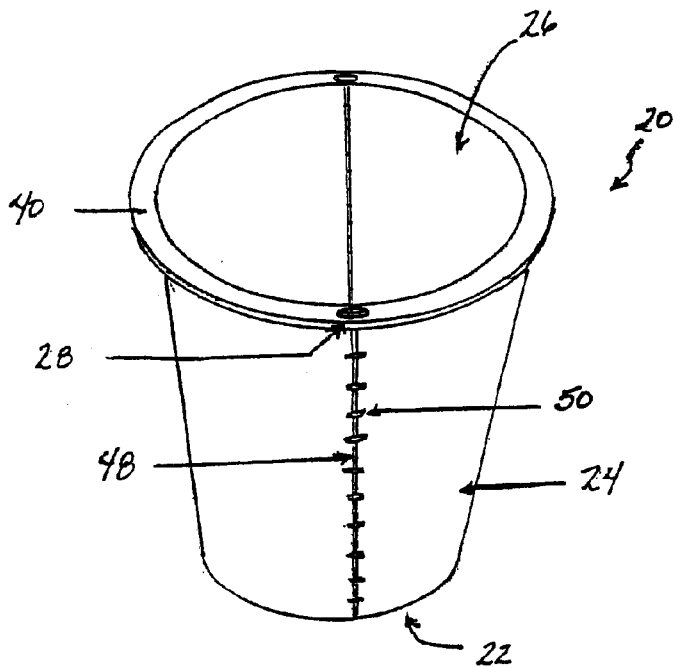
FIG. 10 shows a perspective view of another embodiment of the removable plant container of the present invention having a removal channel formed on the lateral support wall.
Figure 11:
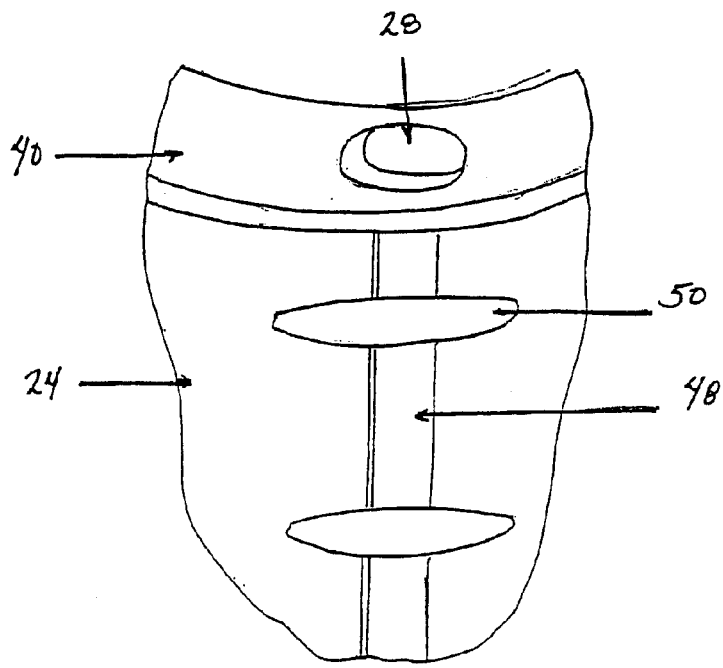
FIG. 11 shows a perspective view of the at least one finger hole located proximate to the at least one removal slot formed on the lateral support wall of the present invention.

FIGS. 10 and 11 show yet another embodiment of the removable plant container 20 of the present invention. The reference numerals shown in FIGS. 10 and 11 have analogous meanings to the reference numerals identifying the features of the previous embodiments as shown in the preceding figures. In the present embodiment, the lateral support wall of the removable plant container 20 may include at least one removal channel 48 formed therein. As shown, the removal channel 48 is positioned on the lateral support wall 24 co-axially aligned along the longitudinal axis of the removable plant container 20, proximate to the at least one finger hole 28. At least one retention bridge 50 traverses the at least one removal channel 48. FIG. 11 shows the finger loop 28 positioned proximate to the removal channel 48.

Figure 12:
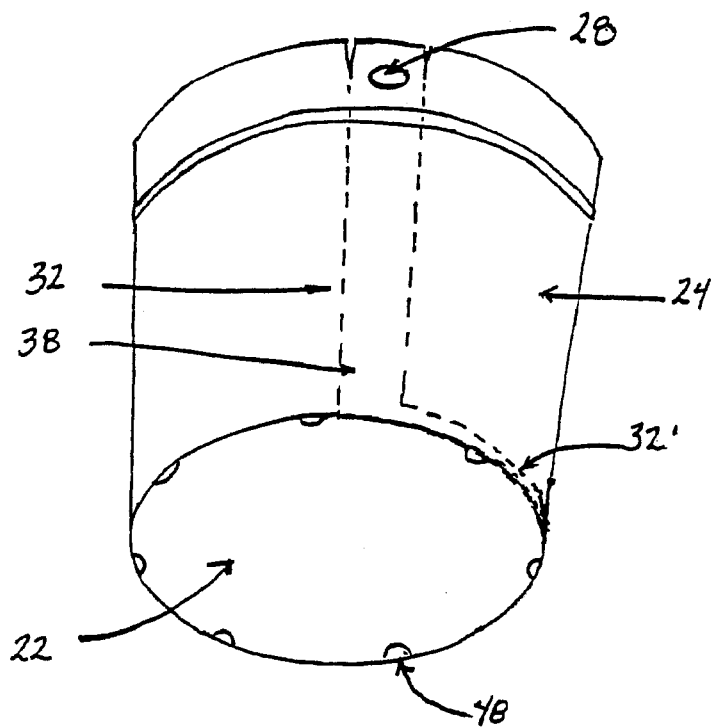
FIG. 12 shows a perspective view of yet another embodiment of the removable plant container of the present invention wherein the at least one tear strip continues laterally around the lateral support wall.
Figure 13:
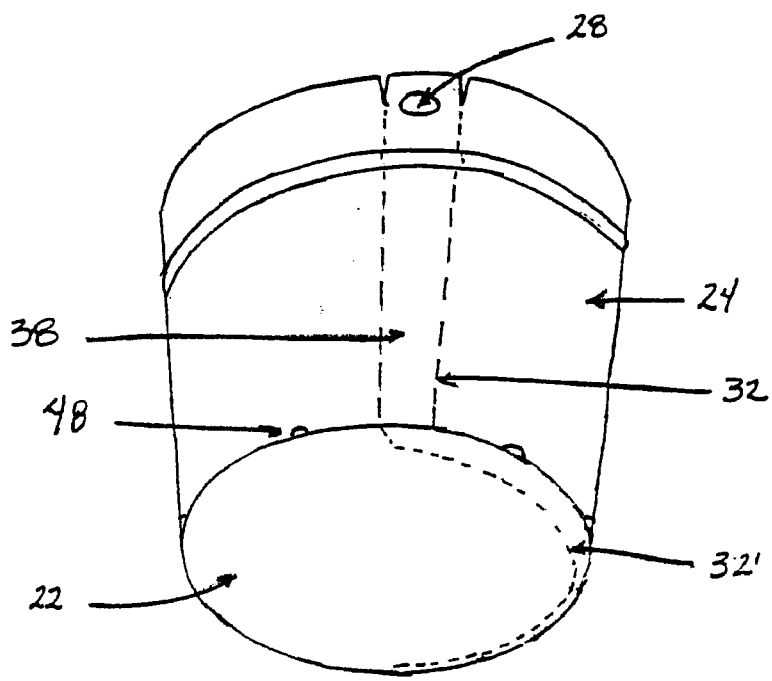
FIG. 13 shows a perspective view of yet another embodiment of the removable plant container of the present invention wherein the at least one tear strip is in communication with the base member.

FIGS. 12 and 13 show yet another embodiment of the removable plant container 20. The reference numerals shown in FIGS. 12 and 13 have analogous meanings to the reference numerals identifying the features of the previous embodiments as shown in the preceding figures. As shown in FIG. 12, the lateral support wall 24 of the present invention may include at least one longitudinal tear strip 32 in communication with at least one lateral tear strip 32'. The at least one lateral tear strip 32' may be located proximate to the base member 22 to effectuate removal of a plant from the removable plant container 20. FIG. 13 shows another embodiment of the present invention having at least one longitudinal tear strip 32 positioned on the lateral support wall 24 in communication with at least one lateral tear strip 32' located on the base member 22. Like the previous embodiment shown in FIG. 12, the at least one lateral tear strip 32' located on the base member 22 effectuates removal of a plant from the removable plant container 20. As shown in FIGS. 12 and 13, one or more drainage holes 48 may be located on the lateral side wall 24, the base member 22, or both to permit the irrigation of the plant within the plant container 20.

The present invention further discloses a method of removing a plant and plant soil or other growing media from the removable plant container 20 of the present invention. More particularly, the method practicing the present invention disclosed herein enables a user to easily remove a plant from a removable plant container 20 with out damaging the plant root system or root ball located within the plant soil or growing media.

Figure 14:
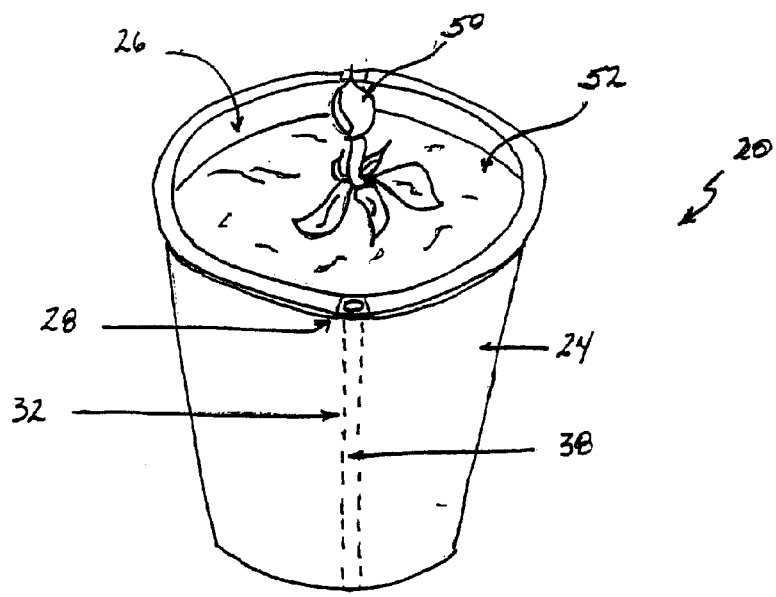
FIG. 14 shows a perspective view of a plant and growing media positioned within the receiving aperture of the present invention.
Figure 15:
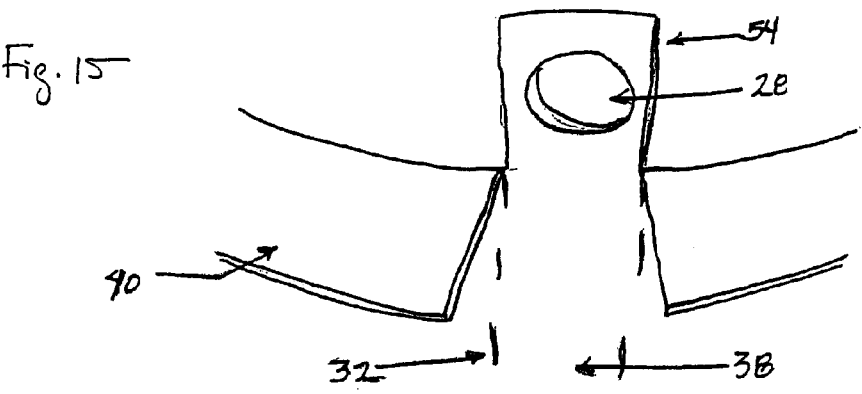
FIG. 15 shows a perspective view of the removal of a plant from an embodiment of the present invention wherein the at least one tear strip is being actuated.
Figure 16:
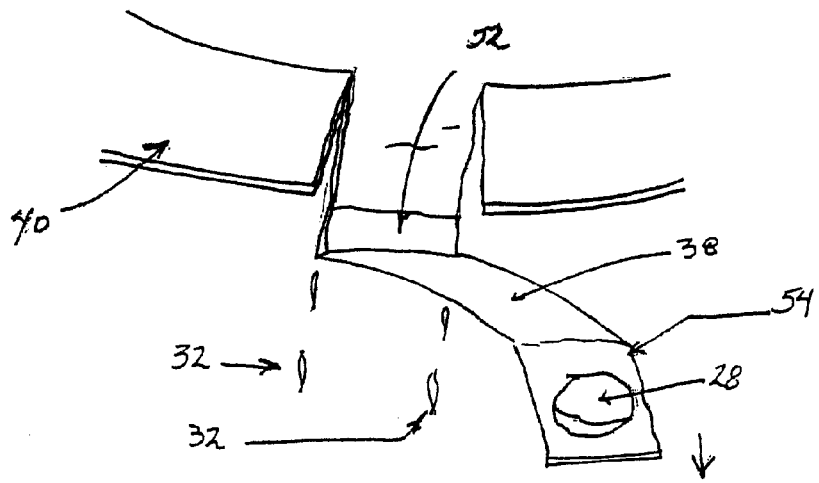
FIG. 16 shows a perspective view of the removal of a plant from an embodiment of the present invention wherein the at least one tear strip is being advanced towards the base member.
Figure 17:
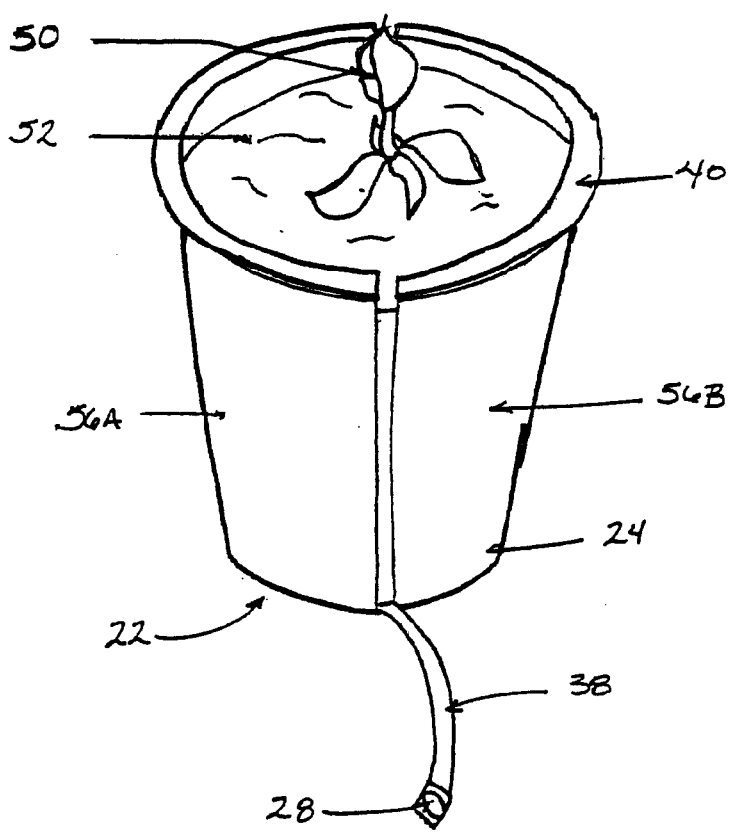
FIG. 17 shows a perspective view of the removal of a plant from an embodiment of the present invention wherein the at least one tear strip is fully actuated.
Figure 18:
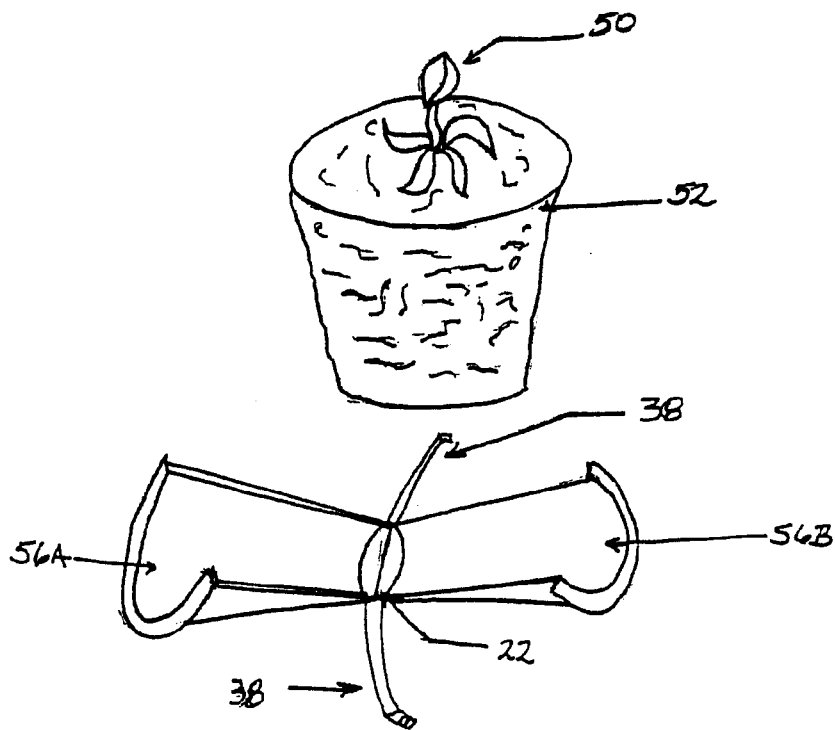
FIG. 18 shows a perspective view of the removal of a plant from an embodiment of the present invention wherein the lateral support wall is forced apart thereby releasing the plant and growing media.

FIGS. 14–18 show one method of removing a plant 50 located within plant soil 52 from the removal plant container in accordance with the present invention. As shown in FIGS. 14–15, the user separates the material tap 54 positioned proximate to or defined by at least one tear strip 32 from the lateral support wall 24. Thereafter, the user engages the at least one finger hole 28 and forces the at least one finger hole 28 outwardly away from the lateral support wall 24 and downwardly towards the base member 22. As shown in FIG. 16, the application of the outward and downward force results in the at least one tear strip 32 to separate from the lateral support wall 24, thereby allowing the at least one tear member 38 to detach from the lateral support wall 24. The continued application of an outward and downward force results in the increased separation of at least one tear member 38 from the lateral support wall 24. FIG. 17 shows the at least one tear member 38 attached only to the base member. As a result, the lateral support wall 24 comprises a first portion 56A and a second portion 56B. As shown in FIG. 18, the user can easily separate the first and second portions 56A, 56B, thereby increasing the volume of the receiving aperture 26 and releasing the plant and plant soil from the removable plant container 20 without damage to the plant root system or root ball.

Figure 19:
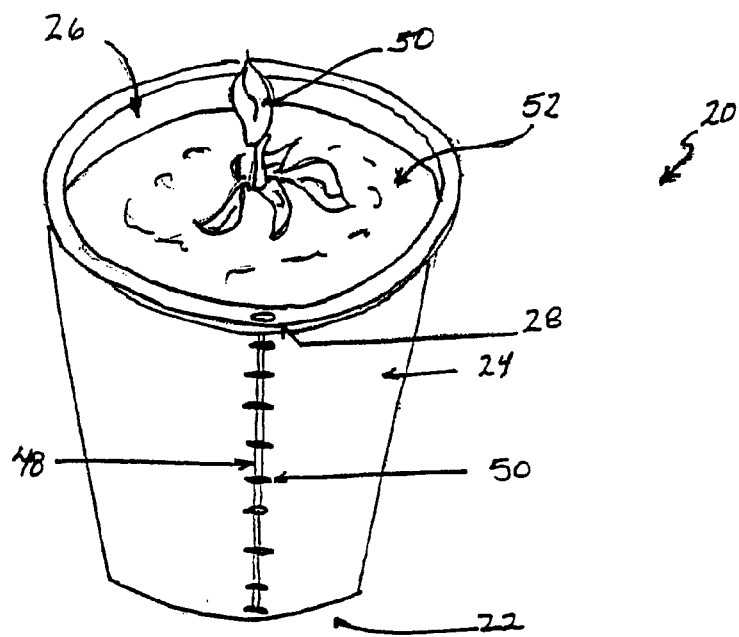
FIG. 19 shows a perspective view of a plant and growing media positioned within the receiving aperture of another embodiment of the present invention.
Figure 20:
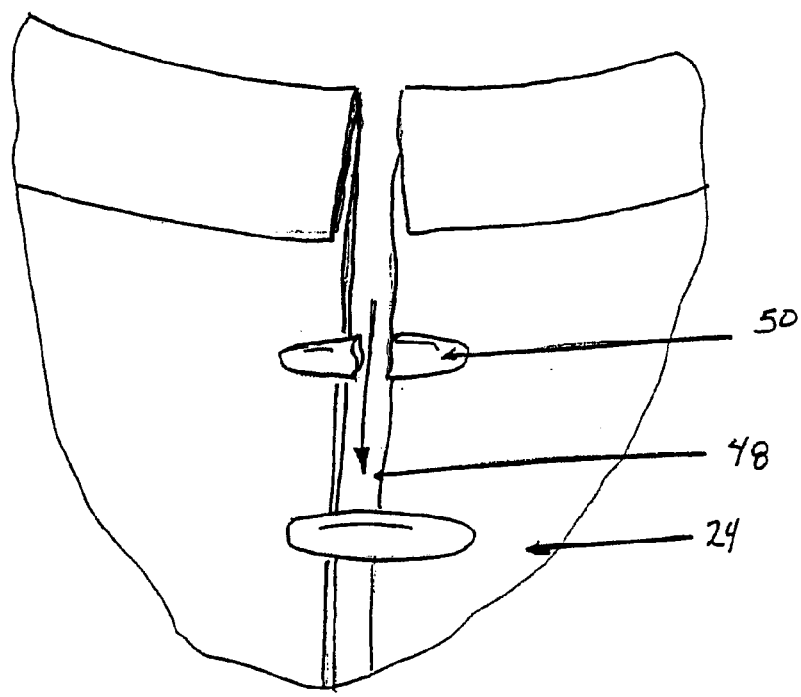
FIG. 20 shows a perspective view of the removal of a plant from another embodiment of the present invention wherein the at least one retention bridge is cut by the user.
Figure 21:
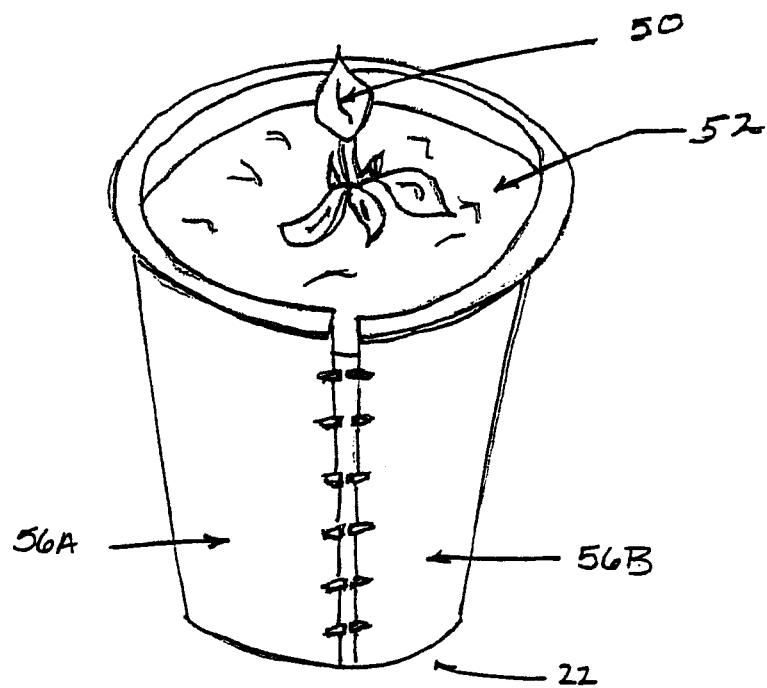
FIG. 21 shows a perspective view of the removal of a plant from another embodiment of the present invention wherein all retention bridges have been severed.
Figure 22:
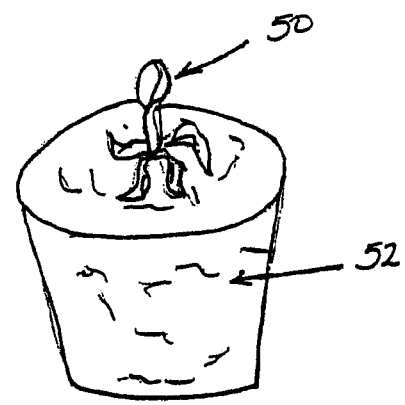
FIG. 22 shows a perspective view of the removal of a plant from another embodiment of the present invention wherein the lateral support wall is forced apart thereby releasing the plant and growing media.
Figure 22:
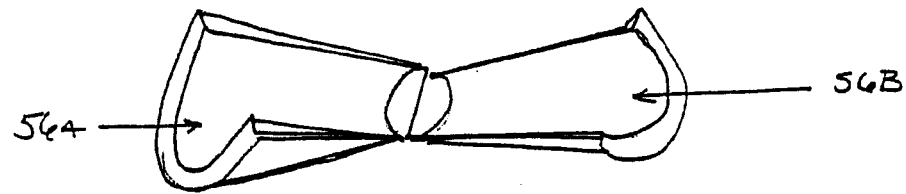

FIGS. 19–22 show an alternate method of practicing the present invention which permits the user to cut away the removable plant container 20 to remove the plant 50 and plant soil 52. Those skilled in the art will appreciate that the present method of practice is particularly useful with embodiments of the removable plant containers shown in FIGS. 8–11. As shown in FIGS. 19–20, the user may use a cutting device to sever or cut the at least one retention member 46 or retention bridge 50 traversing the removal channel 48. As shown in FIGS. 21–22, the plant 50 and the plant soil 52 may be removed once the at least one retention member 46 or retention bridge 50 traversing the removal channel 48 has been cut and the first and second portion 56A, 56B have been separated to increase the volume of the receiving aperture 26.

What is claimed is:

1. A container for holding plants, comprising:
   a base member;
   a lateral support wall integral with said base member;
   a receiving aperture formed by said base member and said lateral support wall, said receiving aperture having a volume V; and
   at least one removal device integral with said lateral support wall of said container, wherein actuation of said at least one removal device serving of said lateral support wallard results in said receiving aperture having a volume V', wherein volume V' is larger than volume V.

2. The device of claim 1, wherein said container is formed in a shape selected from a group consisting of conical, square, rectangular, circular, or cylindrical.

3. The device of claim 1, wherein said base member further comprises at least one hole formed therein.

4. The device of claim 1, wherein said lateral support wall further comprises at least one hole formed therein.

5. The device of claim 1, wherein said at least one removal device is located on said lateral support wall.

6. The device of claim 1, wherein said at least one removal device is located on said base member.

7. The device of claim 1, wherein said at least one removal device is located on said lateral support wall and said base member.

8. The device of claim 1, wherein said at least one removal device is selected from the group consisting of perforated slits, slots, retention bridges, hook and loop devices, buttons, straps, zippers, grooves, or channels.

9. The device of claim 1, wherein said at least one removal device comprises at least one tear strip, said tear strip comprising at least one tear perforation formed in said container.

10. The device of claim 1, wherein said at least one removal device comprises at least one tear device in communication with said container.

11. The device of claim 10, wherein said at least one tear device is embedded in said container.

12. The device of claim 10, wherein said at least one tear device is a material selected from a group consisting of a thread, string, or wire.

13. The device of claim 1, wherein said at least one removal device further comprises at least one tear starter positioned on said container.

14. The device of claim 1, wherein said lateral support wall further comprises at least one finger hole positioned proximate to said at least one removal device.

15. The device of claim 1, further comprising a flange in communication with said lateral support wall.

16. The device of claim 15, wherein said flange further comprises at least one finger hole formed thereon, said finger hole positioned proximate to said at least one removal device.

17. The device of claim 15, wherein said flange further comprises at least one handle formed thereon.

18. The device of claim 1, wherein said container is manufactured from a material selected from the group consisting of plastic, acrylic, thermoplastic, metal, clay, ceramic, fabric, paper, or wood-based product.

19. A container for holding plants, comprising:
    a base member;
    a lateral support wall in communication with said base member, said lateral support wall comprising a first portion and a second portion;
    a receiving aperture formed by said base member and said lateral support wall, said receiving aperture having a volume V;
    at least one tear member integral with and separable from said first portion and said second portion of said lateral support wall, wherein separation of said at least one tear member from said lateral support wall results in severing of said lateral support wall and said receiving aperture having a volume V', wherein volume V' is larger than volume V; and
    at least one finger hole formed in said lateral support wall, said at least one finger hole in communication with at least one removal device.

20. A method of removing a plant from a plant container, comprising:
    providing a plant container comprising a receiving aperture having a volume V, said receiving aperture formed by a base member in communication with a lateral support wall;
    providing at least one removal device integral with said container, said at least one removal device capable of increasing the volume of said at least one receiving aperture from V to V';
    actuating said at least one removal device in communication with said container so as to server said lateral support wall;
    increasing said volume of said receiving aperture from V to V'; and
    removing said plant from said receiving aperture.

21. A container for holding plants comprising:
    a base;
    a wall extending upwardly from said base;
    said wall having a substantially uniform tensile strength;
    a separation zone extending along substantially a length of said wall;
    said separation zone having a tensile strength less than said substantially uniform tensile strength of said wall such that said separation zone serves said wall when a force greater than the tensile strength of said said separation zone is applied to said separation zone.

22. A method of removing a plant from a container comprising:
    providing a container having a plant disposed within a substantially continuous wall of said container;
    exerting a force on a wall of said container at a zone having a tensile strength than the tensile strength of said continuous wall, integral with said continuous wall along substantially a length of said container wall yields so as to disrupt said substantially continuous wall and expose and sever said plant.

* * * * *

UNITED STATES PATENT AND TRADEMARK OFFICE
CERTIFICATE OF CORRECTION

PATENT NO.    : 6,481,593 B2
DATED         : November 19, 2002
INVENTOR(S)   : Banhagel It is certified that error appears in the above-identified patent and that said Letters Patent is hereby corrected as shown below:

Drawings,
Figures 17, 18, 21 and 22, delete "50" insert -- 51 --
Figure 19, delete "50" which points to the plant, and insert -- 51 --

Column 5,
Line 19, after "which" and before "in" delete "are" insert -- is --

Column 6,
Line 24, after "method" and before "practicing" insert -- of --
Line 26, after "20" and before "damaging" delete "with out" insert -- without --
Line 29, after "plant" delete "50" insert -- 51 --
Line 39, after "32" and before "from" delete "to separate" insert -- separating --
Line 55, after "plant" and before "and" delete "50" insert -- 51 --
Line 62, after "plant" and before "and" delete "50" insert -- 51 --

Column 7,
Line 19, after "device" and before "of" delete "serving" insert -- severing --
Line 20, after "support" and before "results" delete "wallard" insert -- wall and --

Signed and Sealed this

Twenty-ninth Day of July, 2003

JAMES E. ROGAN
*Director of the United States Patent and Trademark Office*